US012759874B2

(12) United States Patent
Atilgan et al.

(10) Patent No.: US 12,759,874 B2
(45) Date of Patent: Oct. 13, 2026

(54) SYSTEMS AND METHODS FOR PRODUCING HYDROGEN GAS FROM METHANE AND CARBON DIOXIDE

(71) Applicant: Saudi Arabian Oil Company, Dhahran (SA)

(72) Inventors: Ahmet Atilgan, Houston, TX (US); Hasmukh A. Patel, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 579 days.

(21) Appl. No.: 18/233,574

(22) Filed: Aug. 14, 2023

(65) Prior Publication Data

US 2025/0059033 A1 Feb. 20, 2025

(51) Int. Cl.
*C01B 3/40* (2006.01)

(52) U.S. Cl.
CPC ........ *C01B 3/40* (2013.01); *C01B 2203/0238* (2013.01); *C01B 2203/047* (2013.01); *C01B 2203/0475* (2013.01); *C01B 2203/1047* (2013.01); *C01B 2203/1241* (2013.01); *C01B 2203/80* (2013.01)

(58) Field of Classification Search
CPC .............. C01B 3/40; C01B 2203/0238; C01B 2203/047; C01B 2203/0475; C01B 2203/1047; C01B 2203/1241; C01B 2203/80; C01B 3/10; C01B 3/34; C01B 2203/0222; C01B 2203/04; C01B 3/08
See application file for complete search history.

(56) References Cited

U.S. PATENT DOCUMENTS

2005/0037245 A1* 2/2005 Pham .................. H01M 8/0618 429/495
2010/0305221 A1* 12/2010 Schunk ..................... C01B 3/46 518/704
2013/0171049 A1* 7/2013 Metius .................... F27D 17/10 422/187
2020/0030778 A1* 1/2020 Ide ......................... C10G 35/06

FOREIGN PATENT DOCUMENTS

DE 2139484 A1 6/1972
EP 3194331 B1 * 9/2018 ............... C01B 3/08

OTHER PUBLICATIONS

Abbas et al., "Hydrogen production by methane decomposition: A review", International Journal of Hydrogen Energy, vol. 35, pp. 1160-1190, 2010.
Akri et al., "Atomically dispersed nickel as coke-resistant active sites for methane dry reforming", Nature Communications, vol. 10, pp. 1-10, 2019.

(Continued)

*Primary Examiner* — Anthony J Zimmer
*Assistant Examiner* — Syed T Iqbal
(74) *Attorney, Agent, or Firm* — Dinsmore & Shohl LLP

(57) ABSTRACT

Hydrogen may be produced by a method that includes a first reaction where methane is reacted with carbon dioxide to produce at least carbon monoxide and hydrogen, a second reaction where a metal in a reduced state is reacted with water to form at least hydrogen and a metal in an oxidized state, and a third reaction where carbon monoxide is reacted with the metal in an oxidized state to form at least carbon dioxide and the metal in a reduced state.

20 Claims, 4 Drawing Sheets

(56) References Cited

OTHER PUBLICATIONS

Al-Sayari, "Recent Developments in the Partial Oxidation of Methane to Syngas", The Open Catalysis Journal, vol. 6, pp. 17-28, 2013.
"Hydrogen Production: Natural Gas Reforming", Hydrogen and Fuel Cell Technologies Office, https://www.energy.gov/eere/fuelcells/hydrogen-production-natural-gas-reforming, Accessed Feb. 21, 2023.
Glenk et al., "Economics of converting renewable power to hydrogen", Nature Energy, vol. 4, pp. 216-222, Mar. 2019.
Lee et al., "A review on integrated thermochemical hydrogen production from water", International Journal of Hydrogen Energy, vol. 47, pp. 4346-4356, 2022.
Michiels et al., "Production of hydrogen gas from water by the oxidation of metallic iron under mild hydrothermal conditions, assisted by in situ formed carbonate ions", Fuel, vol. 160, pp. 205-216, 2015.
Notification of Transmittal of the International Search Report and the Written Opinion of the International Searching Authority, or the Declaration dated Nov. 29, 2024 pertaining to International application No. PCT/US2024/041742 filed Aug. 9, 2024, pp. 1-15.
Svoboda et al "Thermodynamic possibilities and constraints for pure hydrogen production by iron based chemical looping process at lower temperatures", Energy Conversion and Management, Elsevier Science Publishers, Oxford, GB, vol. 48, No. 12, Oct. 30, 2007, pp. 3063-3073.

* cited by examiner

SYSTEMS AND METHODS FOR PRODUCING HYDROGEN GAS FROM METHANE AND CARBON DIOXIDE

TECHNICAL FIELD

The present disclosure relates to chemical processing and, more specifically, to methods of making hydrogen.

BACKGROUND

Hydrogen is a versatile gas with a wide range of industrial applications, such as fuel for vehicles, power generation, and as a feedstock for the production of chemicals such as ammonia, methanol, and other important products. It is also used as a reducing agent in metallurgical processes, and for hydrogenation reactions in the food industry. Overall, the demand for hydrogen as a clean and versatile energy carrier is expected to continue to grow in the coming years, particularly in the transportation and power generation sectors. Therefore, the development of new and more efficient methods for producing hydrogen will be needed to meet this demand and address the challenges of climate change and sustainable development.

SUMMARY

Described herein are methods for producing hydrogen gas. In the embodiments described herein, methane and carbon dioxide may be reacted to form carbon monoxide and hydrogen, such as by dry methane reforming. In another reaction, water and a metal in a reduced state can react to oxidize the metal and form additional hydrogen, such as in a water splitting reaction. Then, the carbon monoxide may be utilized in a reaction whereby the metal in an oxidized state is reduced. In some embodiments, the metal can be cyclically oxidized and reduced, utilizing water and the carbon monoxide produced in the reaction of the methane and carbon dioxide. In some such embodiments, endothermic reactions such dry methane reforming may be paired with exothermic reactions such as metal reduction (utilizing carbon monoxide, a product of the dry methane reforming) to efficiently form hydrogen. For example, as described herein, the metal may be sequentially oxidized to from hydrogen and reduced by carbon monoxide, a product of the dry methane reforming reaction.

According to one or more embodiments described herein, a method for producing hydrogen gas may comprise a first reaction, a second reaction, and third reaction. The method may comprise, in a first reaction, reacting methane with carbon dioxide to form at least carbon monoxide and hydrogen. The method may also comprise, in a second reaction, reacting at least water with a metal in a reduced state to form at least hydrogen and a metal in an oxidized state. The method may also comprise, in a third reaction, reacting the metal in an oxidized state produced in the second reaction with at least a portion of the carbon monoxide produced in the first reaction to form carbon dioxide and to reduce the metal in the oxidized state.

According to one or more embodiments described herein, a method for producing hydrogen may comprises passing methane and carbon dioxide to a first reactor, such that the methane and carbon dioxide react to form at least carbon monoxide and hydrogen. The method also comprise passing water to a second reactor comprising a metal in a reduced state, such that the water reacts with the metal in a reduced state to form at least hydrogen and a metal in an oxidized state in the second reactor. The method may further comprise passing at least a portion of the carbon monoxide produced in the first reactor to the second reactor while the metal in an oxidized state is positioned in the second reactor, such that the metal in an oxidized state reacts with carbon monoxide to form at least the metal in a reduced state and carbon dioxide These and other embodiments are described in more detail in the Detailed Description. It is to be understood that both the foregoing general description and the following detailed description present embodiments of the described technology, and are intended to provide an overview or framework for understanding the nature and character of the described technology as it is claimed. The accompanying drawing is included to provide a further understanding of the described technology and are incorporated into and constitute a part of this specification. The drawing illustrates various embodiments and, together with the description, serve to explain the principles and operations of the described technology. Additionally, the drawing and descriptions are meant to be merely illustrative, and are not intended to limit the scope of the claims in any manner.

BRIEF DESCRIPTION OF THE DRAWING

The following detailed description of specific embodiments of the present disclosure can be best understood when read in conjunction with the following drawing, where like structure is indicated with like reference numerals and wherein.

Figure 1:
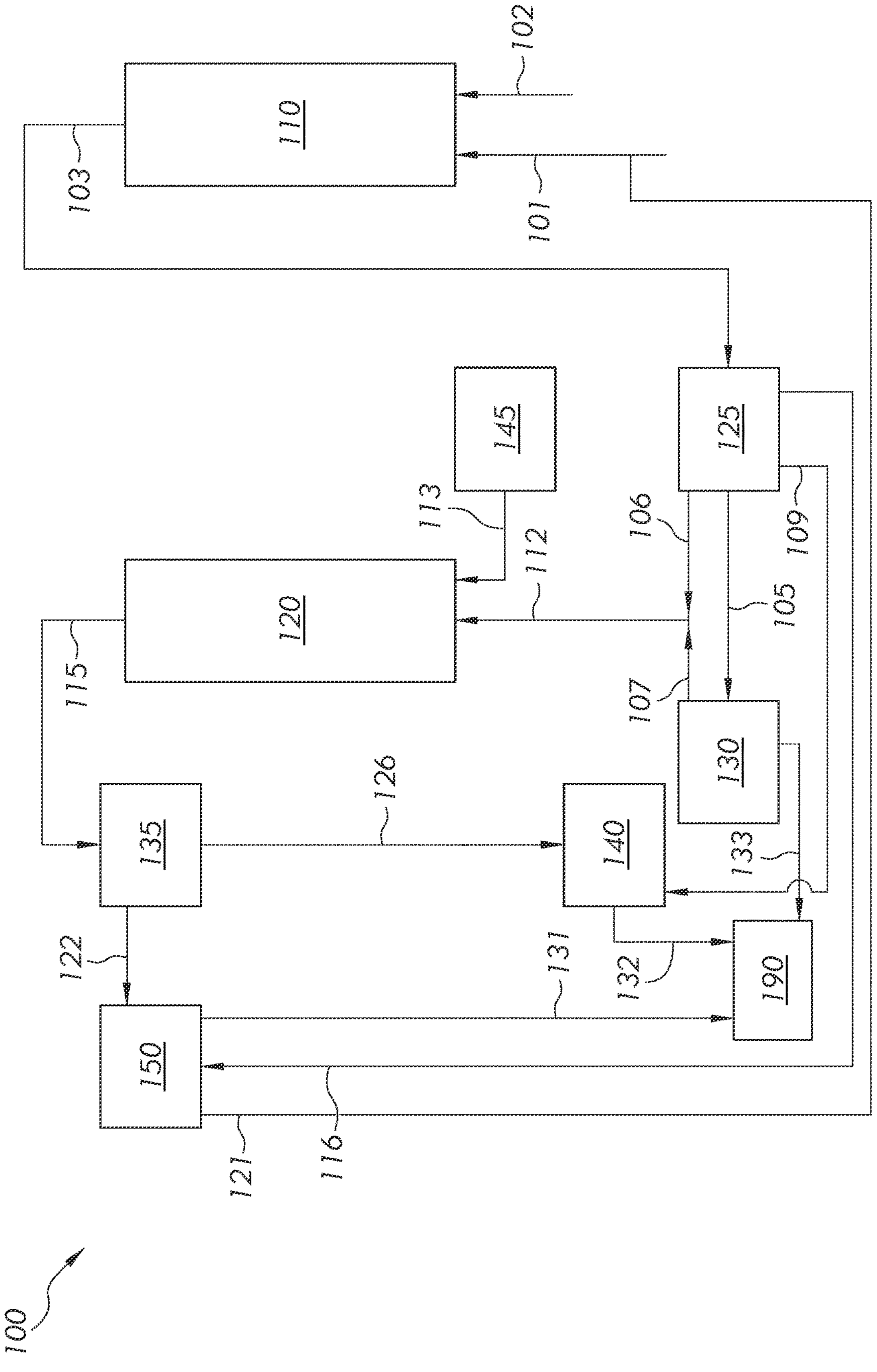
FIG. 1 schematically depicts a system for producing hydrogen gas, according to one or more embodiments disclosed herein.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should be understood that features described in the various drawings may be used in combination with other aspects in different drawings. That is, the embodiment of FIG. 1 may utilize features of the embodiment of FIG. 2, 3 or 4, and so forth, as would be understood by those skilled in the art.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawing. Whenever possible, the same reference numerals will be used throughout the drawing to refer to the same or similar parts.

DETAILED DESCRIPTION

The present disclosure is directed to methods of producing hydrogen. Generally, the methods are described herein in a series of reactions, described as a "first reaction," "second reaction," etc. The products of some reactions may be the reactants of other reactions, as described in detail herein. Additionally, the reactions are described in the context of processing systems, such as those of FIGS. 1, 2, 3 and 4. However, it should be understood that the methods may be utilized independently of the processing systems described herein, and it is contemplated that other systems may be utilized to practice the presently described technology.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. Simply dividing a stream into two streams having the same composition is also not considered to comprise an intervening system that changes the composition of the stream.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in this disclosure, a "catalyst" may refer to any substance that increases the rate of a specific chemical reaction. As used herein, "reacting" may be performed by contacting reactants at conditions (e.g., temperatures and pressures) suitable for the reaction to take place. The reactions described herein may include reactants and/or products not positively recited. Reactions may utilize catalysts, but the catalysts are generally not consumed in the reaction.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor.

As used in this disclosure, a "storage vessel" refers to a container in which one or more fluids may be stored. For example, a storage vessel may store liquid, gas, or a combination of both. The storage vessels are not limited by geometric shape and/or size, and can include tanks, drums, silos, pipelines, and the like.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" may more particularly be used to refer to a stream that is passed out of a reactor or reaction zone.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. It should be understood that a "separation unit" is a separation unit used primarily for the separation of two or more gases.

According to one or more embodiments, hydrogen gas may be produced by a series of reactions. As described herein, a first reaction may form hydrogen a carbon monoxide from methane and carbon dioxide. A second reaction may oxidize a metal to form additional hydrogen. Then, a third reaction may reduce the oxidized metal by use of the carbon monoxide from the first reaction. These embodiments, as well as others, are described hereinbelow in detail.

A first reaction may include reacting methane with carbon dioxide to form at least carbon monoxide and hydrogen. Reaction I, below, depicts an example of the first reaction. It should be noted that in various examples, iron is utilized as a metal that is reduced and oxidized. However, other metals are contemplated as appropriate for use in a similar role, and the methods described herein should not be limited to the use of iron unless explicitly stated herein.

In Reaction I, methane and carbon dioxide react to form at least carbon monoxide and hydrogen, also known as dry methane reforming. Dry reforming of methane may be performed with or without a catalyst. Suitable catalysts may be based on any suitable elements such as, but not limited to, noble metals, iron, cobalt and nickel. The catalysts may be supported by any conventional or unconventional catalyst supports such as cerium oxide, aluminum oxide, silicon oxide, or the like. Catalysts may be or may not be reinforced by any promoters such as adding lanthanide, and alkaline/alkaline earth metals. Catalysts could be mixed or prepared with porous materials such as metal-organic frameworks, porous-organic polymers, activated carbon, amorphous carbon, coal, carbon fibers/nanotubes, graphite, graphene, zeolite, silicon oxide, selenium oxide, aluminum oxide, zirconium oxide, titanium oxide, hafnium oxide, cerium oxide, porous inorganic polymers, and others.

Reaction I $$CH_4 + CO_2 \xrightarrow{\text{yields}} 2CO + 2H_2$$

The method for producing hydrogen may further include a second reaction that includes reacting at least water with a metal in a reduced state to form at least hydrogen and a metal in an oxidized state. Reaction II, below, depicts an example of the second reaction.

In Reaction II, a water-splitting reaction is depicted. A reduced metal, such as zero-valent iron ($Fe^0$), and water react to form an oxidized metal, such as iron oxide ($Fe_3O_4$), and hydrogen. Among the various processes for hydrogen production from water splitting, thermochemical-based water splitting may be an option for large-scale production in terms of cost and total production quantity. In some embodiments, thermolysis of water may utilize relatively high temperatures (e.g., greater than 2700° C.). To enable the water-splitting reaction at lower temperatures, a pair of metal oxide halides and metal oxides can be used to decrease the required maximum temperature below 800° C.

Reaction II $$3Fe^0 + 4H_2O \xrightarrow{\text{yields}} Fe_3O_4 + 4H_2$$

The method for producing hydrogen may further include a third reaction that includes reacting the metal in an oxidized state produced in the second reaction with at least a portion of the carbon monoxide produced in the first reaction to form carbon dioxide and to reduce the metal in the oxidized state. Reaction III, below, depicts an example of the third reaction.

In Reaction III, the oxidized metal ($Fe_3O_4$) and carbon monoxide react to form the reduced metal ($Fe^0$) and carbon dioxide. Reaction II and Reaction III may be sequentially alternated such that the reducing of the iron in an oxidized state in Reaction III forms the iron in a reduced state utilized as a reactant in Reaction II. The first reaction may occur in a first reactor, and the second reaction and third reaction may occur in a second reactor.

Reaction III $$Fe_3O_4 + 4CO \xrightarrow{\text{yields}} 3Fe^0 + 4CO_2$$

The method for producing hydrogen may further include a fourth reaction that includes reacting carbon dioxide and water with the metal in a reduced state to form at least hydrogen and a metal carbonate. Reaction IV, below, depicts an example of the fourth reaction.

In Reaction IV, the reduced metal ($Fe^0$), reacts with carbon dioxide, and water to form a metal carbonate, iron carbonate ($FeCO_3$), and hydrogen.

Reaction IV $$3Fe^0 + 3CO_2 + 3H_2O \xrightarrow{\text{yields}} 3FeCO_3 + 3H_2$$

The method for producing hydrogen may further include a fifth reaction that includes reacting the metal carbonate with water to from the metal in an oxidized state, carbon dioxide, and hydrogen. Reaction V, below, depicts an example of the fifth reaction.

In Reaction V, iron carbonate ($FeCO_3$) and water react to form an oxidized metal ($Fe_3O_4$), hydrogen, and carbon dioxide. The first reaction may occur in a first reactor, and the fourth, fifth, and third reactions may occur in a second reactor.

Reaction V $$3FeCO_3 + H_2O \xrightarrow{\text{yields}} Fe_3O_4 + H_2 + 3CO_2$$

The fourth, fifth, and third reactions may be sequentially alternated such that the reducing of the metal in the oxidized state in the third reaction forms the metal in a reduced state utilized in the fourth reaction.

The metal in an oxidized state may comprise one or more of zinc oxide, iron oxide, tin oxide, cesium oxide, magnesium oxide, cobalt oxide, cadmium oxide, or germanium oxide. In embodiments, the metal in an oxidized state may iron oxide ($Fe_3O_4$).

In other embodiments, the metal in an oxidized state may comprise ceria ($CeO_2$), which may be doped with zirconium, lanthanum, strontium, and other dopants known in the art. Without being bound by any theory, it is believed that doping ceria may improve its reducibility. Ceria may be effective at temperatures of about 1600° C. to about 1800° C. for reduction. Additionally, according to some embodiments, ceria may have high oxygen storage capacity and oxygen-ion conductivity, which allows for nonstoichiometric reduction to $CeO_{2-\delta}$.

In other embodiments, the metal in an oxidized state may comprise ferrites, or iron oxides such as $Fe_3O_4$, and $Fe_2O_3$. Ferrites, in some embodiments, may be effective at temperatures of about 1200° C. to about 1500° C. for reduction.

In yet other embodiments, the metal in an oxidized state may be perovskites (e.g., $AmO_3$). In some embodiments, Perovskites may be effective at temperatures of less than about 1600° C. for reduction. Perovskites may be doped with lanthanum manganite and ferrites (e.g., $La_{(1-x)}Sr_xCoO_3$, $La_{(1-x)}Sr_xMnO_3$, etc.).

In yet other embodiments, the metal in an oxidized state may comprise hercynite ($FeAl_2O_4$). Hercynite, in some embodiments, may be effective at temperatures of 1475° C. for reduction.

The metal in a reduced state may comprise one or more of zinc, iron, tin, cesium, magnesium, cobalt, cadmium, or germanium. In embodiments, the metal in a reduced state may comprise iron ($Fe^0$).

The methods for producing hydrogen described herein may utilize the processing system of FIG. 1. The methods are described in the context of the system of FIG. 1, but it is contemplated that many other systems may be suitable for the methods described herein. In particular, other systems and methods than those described with respect to FIG. 1 may be suitable, such as, without limitation, alternative separation schemes, alternative stream processing, and the ordering of the separation and/or processing steps disclosed. In particular, FIG. 1 will be described in detail herein, where various streams and processes described herein will be described in the context of the system of FIG. 1. However, the steps, streams, or other features of the disclosed methods stand independent of the system of FIG. 1, and FIG. 1 is merely provided to show one or more suitable systems as presently contemplated.

Now referring to FIG. 1, in one or more embodiments, the system 100 for hydrogen production may include a first reactor 110 and a second reactor 120 downstream of the first reactor 110. Carbon dioxide (from a carbon dioxide feed stream 101) and methane (from a methane feed stream 102) may be passed to the first reactor 110, such that the methane and carbon dioxide contact one another within the first reactor 110. The carbon dioxide and methane may react to form carbon monoxide and hydrogen. The carbon monoxide and hydrogen may exit the first reactor 110 via a first effluent 103. One example of such a reaction is shown in Reaction I, above. It is contemplated that in embodiments, at least some carbon dioxide may remain in the first effluent 103.

In embodiments, the first reactor 110 may operate at a temperature greater than or equal to 700° C. and less than or equal to 900° C. In embodiments, the first reactor 110 may operate at a temperature greater than or equal to 25° C. greater than or equal to 200° C. greater than or equal to 400° C., or greater than or equal to 600° C. In embodiments, the first reactor 110 may operate at a temperature from 25° C. to 200° C. from 200° C. to 400° C. from 400° C. to 600° C. from 700° C. to 900° C. from 900° C. to 1100° C. from 1100° C. to 1300° C. from 1300° C. to 1500° C. from 1500° C. to 1700° C., from 1700° C. to 1900° C. from 1900° C. to 2000° C., or any combination of any two or more of these ranges.

In embodiments, the first reactor 110 may operate at a pressure greater than or equal to 0.1 MPa (1 bar) and less than or equal to 3 MPa (30 bar). In embodiments, the first reactor 110 may operate at a pressure greater than or equal to 0.1 MPa, greater than or equal to 0.5 MPa, greater than or equal to 1 MPa, greater than or equal to 1.5 MPa, or greater than or equal to 2 MPa. In embodiments, the first reactor 110 may operate at a pressure from 0.1 MPa to 0.5 MPa, from 0.5 MPa to 1 MPa, from 1 MPa to 1.5 MPa, from 1.5 MPa to 2.0 MPa, from 2.0 MPa to 2.5 MPa, from 2.5 MPa to 3.0 MPa, 3.0 MPa to 3.5 MPa, 3.5 MPa to 4.0 MPa, 4.0 MPa to 4.5 MPa, 4.5 MPa to 5.0 MPa or any combination of any two or more of these ranges.

According to embodiments, the first effluent 103 may include carbon monoxide and hydrogen. The first effluent 103 may be passed to a first separation unit 125 to separate at least the carbon monoxide from hydrogen. In embodiments, the first effluent 103 may continue to the first separation unit 125. The first separation unit 125 may separate the carbon monoxide from the hydrogen. In some embodiments, it is contemplated that the first separation unit 125 may also separate carbon dioxide from the carbon dioxide feed stream 101.

In embodiments, the first separation unit 125 may produce a first carbon monoxide effluent 105 and a first hydrogen effluent 109. The first carbon monoxide effluent 105 may be passed to a carbon monoxide storage vessel 130. In embodiments, it is contemplated that the first separation unit 125 may also produce a second carbon monoxide effluent 106. The carbon monoxide storage vessel 130 may pass a carbon monoxide storage vessel effluent 107 to mix with the second carbon monoxide effluent 106 to create a carbon monoxide stream 112. The first hydrogen effluent 109 may be passed to a hydrogen storage vessel 140. In embodiments where some carbon dioxide remains in the first effluent 103, the first separation unit 125 may also produce a first carbon dioxide effluent 116 that may be passed to a carbon dioxide storage vessel 150.

In embodiments, the first separation unit 125 may operate at a temperature greater than or equal to 200° C. and less than or equal to 600° C. In embodiments, the first separation unit 125 may operate at a temperature greater than or equal to 20° C., greater than or equal to 100° C., greater than or equal to 200° C., greater than or equal to 300° C., greater than or equal to 400° C., or greater than or equal to 500° C. In embodiments, the first separation unit 125 may operate at a temperature of from 100° C. to 200° C., 200° C. to 300° C., from 300° C. to 400° C., from 400° C. to 500° C., from 500° C. to 600° C., from 600° C. to 700° C., from 700° C. to 800° C., from 800° C. to 900° C., from 900° C. to 1000° C., or any combination of any two or more of these ranges.

In embodiments, the first separation unit 125 may operate at a pressure greater than or equal to 0.1 MPa (1 bar) and less than or equal to 3 MPa (30 bar). In embodiments, the first separation unit 125 may operate at a pressure greater than or equal to 0.1 MPa, greater than or equal to 0.5 MPa, greater than or equal to 1 MPa, greater than or equal to 1.5 MPa, or greater than or equal to 2 MPa. In embodiments, the first separation unit 125 may operate at a pressure from 0.1 MPa to 0.5 MPa, from 0.5 MPa to 1 MPa, from 1 MPa to 1.5 MPa, from 1.5 MPa to 2.0 bar, from 2.0 MPa to 2.5 MPa, from 2.5 MPa to 3.0 MPa, 3.0 MPa to 3.5 MPa, 3.5 MPa to 4.0 MPa, 4.0 MPa to 4.5 MPa, 4.5 MPa to 5.0 MPa, or any combination of any two or more of these ranges.

Still referring to FIG. 1, the system 100 for hydrogen production may further include passing a water feed stream 113 from a water generator unit 145 to the second reactor 120 comprising a metal in a reduced state such that the water and the metal in a reduced state contact one another. The water and the metal in a reduced state may react to form a metal in an oxidized state and hydrogen. One example of such a reaction is shown in Reaction II, above. In embodiments, the water feed stream 113 may be in liquid or vapor form. In embodiments, the metal in an oxidized state may comprise one or more of zinc oxide, iron oxide, tin oxide, cesium oxide, magnesium oxide, cobalt oxide, cadmium oxide, or germanium oxide. In embodiments, the metal in an oxidized state may iron oxide ($Fe_3O_4$).

In embodiments, the second reactor 120 may continue to react the water feed stream 113 with the metal in a reduced state until the hydrogen production within the second reactor 120 slows to certain levels. It is contemplated that the levels of hydrogen production may be monitored by various means. For example, the ratio between hydrogen and steam may be monitored such that when the ratio falls below a specific threshold, the reaction between water and metal in the second reactor 120 may be stopped. In other embodiments, the total hydrogen production may be monitored as a function of catalyst weight. In some embodiments, the temperature and heat flow may be monitored to determine when hydrogen production is complete. For example, when a decrease in temperature is observed, it may indicate that the metal and water reaction has slowed and the reaction should be stopped. It should be understood that other monitoring methods may be employed, as would be understood by those skilled in the art.

Still referring to FIG. 1, the system 100 for hydrogen production may further include passing carbon monoxide (from a carbon monoxide stream 112) to the second reactor 120 while the metal in an oxidized state is positioned within the second reactor 120 such that the carbon monoxide and the metal in an oxidized state contact one another. The carbon monoxide and metal in an oxidized state may react to form at least the metal in a reduced state and carbon dioxide. In embodiments, the metal in a reduced state may comprise one or more of zinc, iron, tin, cesium, magnesium, cobalt, cadmium, or germanium. In embodiments, the metal in a reduced state may comprise iron ($Fe^0$).

In embodiments, carbon monoxide passed to the second reactor 120 may be the carbon monoxide produced in the first reactor 110. In embodiments, carbon monoxide may enter the second reactor 120 via the carbon monoxide stream 112. The carbon monoxide stream 112 may comprise carbon monoxide from a second carbon monoxide effluent 106, the carbon monoxide storage vessel effluent 107, or both.

In embodiments, the second reactor 120 may operate at a temperature greater than or equal to 500° C. and less than or equal to 1800° C. In embodiments, the second reactor 120 may operate at a temperature greater than or equal to 900° C. and less than or equal to 1500° C. In embodiments, the second reactor 120 may operate at a temperature greater than or equal to 100° C., greater than or equal to 200° C., greater than or equal to 300° C., greater than or equal to 400° C., greater than or equal to 500° C., greater than or equal to 600° C., greater than or equal to 700° C., or even greater than or equal to 800° C. In embodiments, the second reactor 120 may operate at a temperature of from 500° C. to 600° C., from 600° C. to 700° C., from 700° C. to 800° C., from 800° C. to 900° C., from 900° C. to 1000° C., from 1000° C. to 1100° C., from 1100° C. to 1200° C., from 1200° C. to 1300° C., from 1300° C. to 1400° C., from 1400° C. to 1500° C., from 1500° C. to 1600° C., from 1600° C. to 1700° C., from 1700° C. to 1800° C., or any combination of any two or more of these ranges.

In embodiments, the second reactor 120 may operate at a pressure greater than or equal to 1 MPa (10 bar) and less than or equal to 1.5 MPa (15 bar). In embodiments, the second reactor 120 may operate at a pressure greater than or equal to 0.1 MPa, greater than or equal to 0.5 MPa, greater than or equal to 1 MPa, greater than or equal to 1.5 MPa, or greater than or equal to 2 MPa. In embodiments, the second reactor 120 may operate at a pressure from 0.1 MPa to 0.5 MPa, from 0.5 MPa to 1 MPa, from 1 MPa to 1.5 MPa, from 1.5 MPa to 2.0 bar, from 2.0 MPa to 2.5 MPa, from 2.5 MPa to 3.0 MPa, 3.0 MPa to 3.5 MPa, 3.5 MPa to 4.0 MPa, or any combination of any two or more of these ranges.

According to embodiments, once the metal is returned to an oxidized state, the hydrogen and carbon dioxide may proceed from the second reactor 120 via a mixed gas effluent 115. In embodiments, the temperature and heat flow data may be monitored from the second reactor 120. For example, when a decrease in temperature is observed, it may indicate that the reaction between the carbon monoxide and the metal in an oxidized state has slowed and the reaction should be stopped. In embodiments, the mixed gas effluent 115 may be passed to a second separation unit 135. The second separation unit 135 may separate the carbon dioxide from the hydrogen in the mixed gas effluent 115.

The passing of the water feed stream 113 to the second reactor 120 and the passing of the carbon monoxide produced in the first reactor 110 via the carbon monoxide stream 112 to the second reactor 120 may be sequentially alternated, such that the metal in a reduced state formed from the reaction of the metal in an oxidized state with carbon monoxide from the carbon monoxide stream 112 forms the metal in a reduced state that is reacted with the water feed stream 113.

According to additional embodiments, it is also contemplated that the second reactor 120 may operate at substantially steady-state conditions by utilizing a catalyst regenerator and circulating the catalyst between the second reactor 120 and a regenerator. For example, the water feed stream 113 may be passed to the second reactor 120 comprising a metal in a reduced state such that the water and the metal in a reduced state contact one another. The water and the metal in a reduced state may react to form a metal in an oxidized state and hydrogen. The hydrogen may be passed out of the second reactor 120, and the metal in an oxidized state may be passed from the second reactor 120 to a catalyst regeneration unit (not shown in the figures). Carbon monoxide from the carbon monoxide stream 112 may be passed to the regeneration unit that now comprises the metal in an oxidized state such that the carbon monoxide and the metal in an oxidized state contact one another. The carbon monoxide and metal in an oxidized state may react to form at least the metal in a reduced state and carbon dioxide. The carbon dioxide may be passed out of the catalyst regeneration unit and the metal in a reduced state may be passed back to the second reactor 120 to begin the cycle again.

In embodiments, the second separation unit 135 may operate at a temperature greater than or equal to 200° C. and less than or equal to 600° C. In embodiments, the second separation unit 135 may operate at a temperature greater than or equal to 20° C., greater than or equal to 100° C., greater than or equal to 200° C., greater than or equal to 300° C., greater than or equal to 400° C., or greater than or equal to 500° C. In embodiments, the second separation unit 135 may operate at a temperature of from 100° C. to 200° C., 200° C. to 300° C., from 300° C. to 400° C., from 400° C. to 500° C., from 500° C. to 600° C., from 600° C. to 700° C., from 700° C. to 800° C., from 800° C. to 900° C., from 900° C. to 1000° C., or any combination of any two or more of these ranges.

In embodiments, the second separation unit 135 may operate at a pressure greater than or equal to 0.1 MPa (1 bar) and less than or equal to 3 MPa (30 bar). In embodiments, the second separation unit 135 may operate at a pressure greater than or equal to 0.1 MPa, greater than or equal to 0.5 MPa, greater than or equal to 1 MPa, greater than or equal to 1.5 MPa, or greater than or equal to 2 MPa. In embodiments, the second separation unit 135 may operate at a pressure from 0.1 MPa to 0.5 MPa, from 0.5 MPa to 1 MPa, from 1 MPa to 1.5 MPa, from 1.5 MPa to 2.0 bar, from 2.0 MPa to 2.5 MPa, from 2.5 MPa to 3.0 MPa, 3.0 MPa to 3.5 MPa, 3.5 MPa to 4.0 MPa, 4.0 MPa to 4.5 MPa, 4.5 MPa to 5.0 MPa, or any combination of any two or more of these ranges.

In embodiments, the second separation unit 135 may produce a second carbon dioxide effluent 122 and a second hydrogen effluent 126. The second carbon dioxide effluent 122 may be passed to the carbon dioxide storage vessel 150. In embodiments, a carbon dioxide storage vessel effluent 121 comprising carbon dioxide may be passed from the carbon dioxide storage vessel 150 to the first reactor 110 as a recycle stream. The second hydrogen effluent 126 may be passed to the hydrogen storage vessel 140. In embodiments, the carbon monoxide storage vessel 130, the hydrogen storage vessel 140, and the carbon dioxide storage vessel 150 may be fluidly coupled to a vent 190 via streams 133, 132, and 131, respectively.

It is contemplated that the carbon monoxide, carbon dioxide, and hydrogen stored in the respective storage vessels may be passed upstream or downstream for further processing. In embodiments, the system 100 may operate continuously at steady state or may operate discretely.

Figure 4:
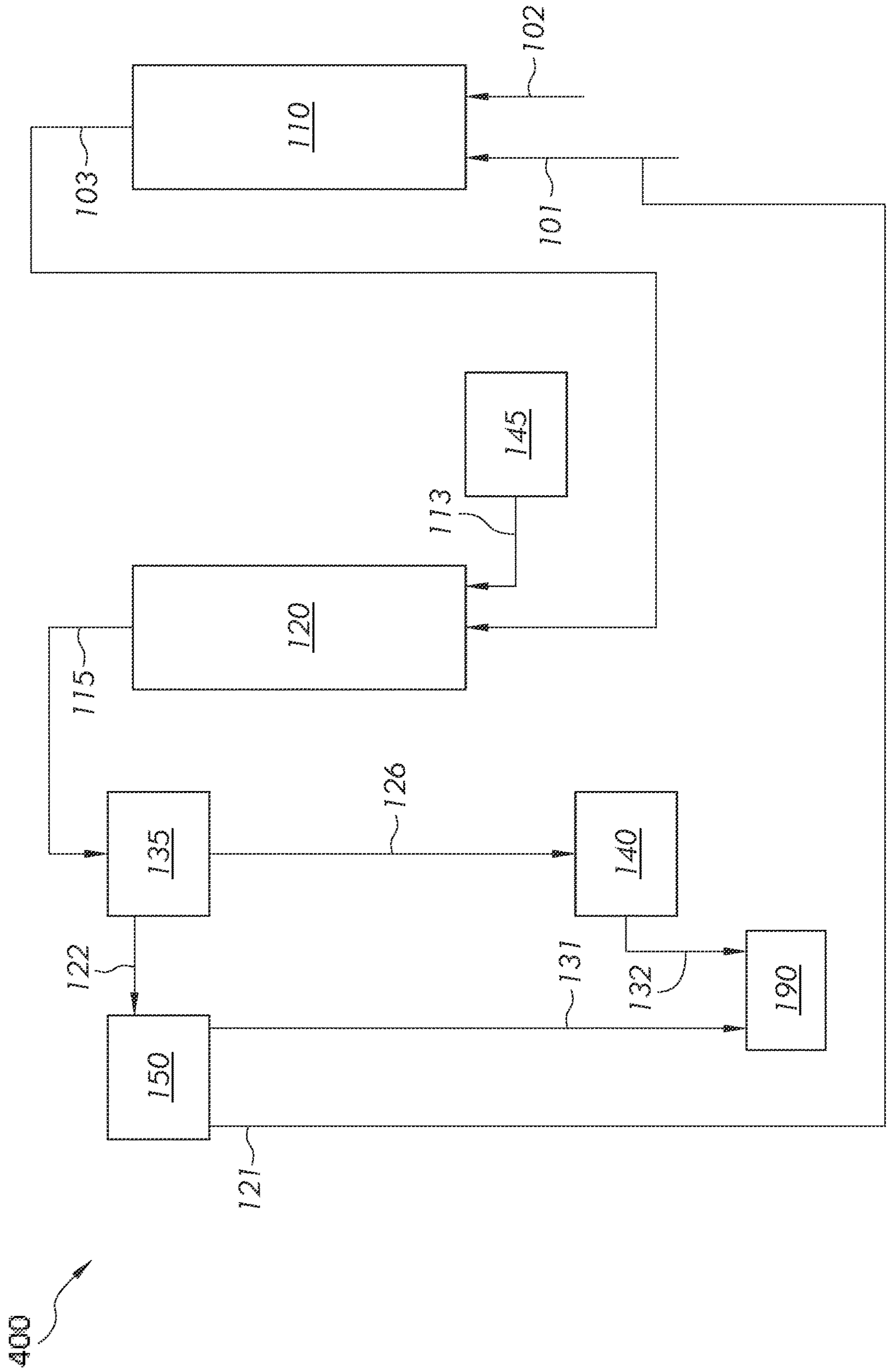
FIG. 4 schematically depicts yet another system for producing hydrogen gas, according to one or more embodiments disclosed herein.

Referring to FIG. 4, in some embodiments, it is contemplated that the first effluent 103 may bypass the first separation unit 125 by being passed further downstream in the system 100 to the second reactor 120 in a system 400. The first effluent 103 may comprise a combination of carbon monoxide and hydrogen. In embodiments, the first effluent 103 may comprise carbon dioxide from the carbon dioxide feed stream 101.

Figure 2:
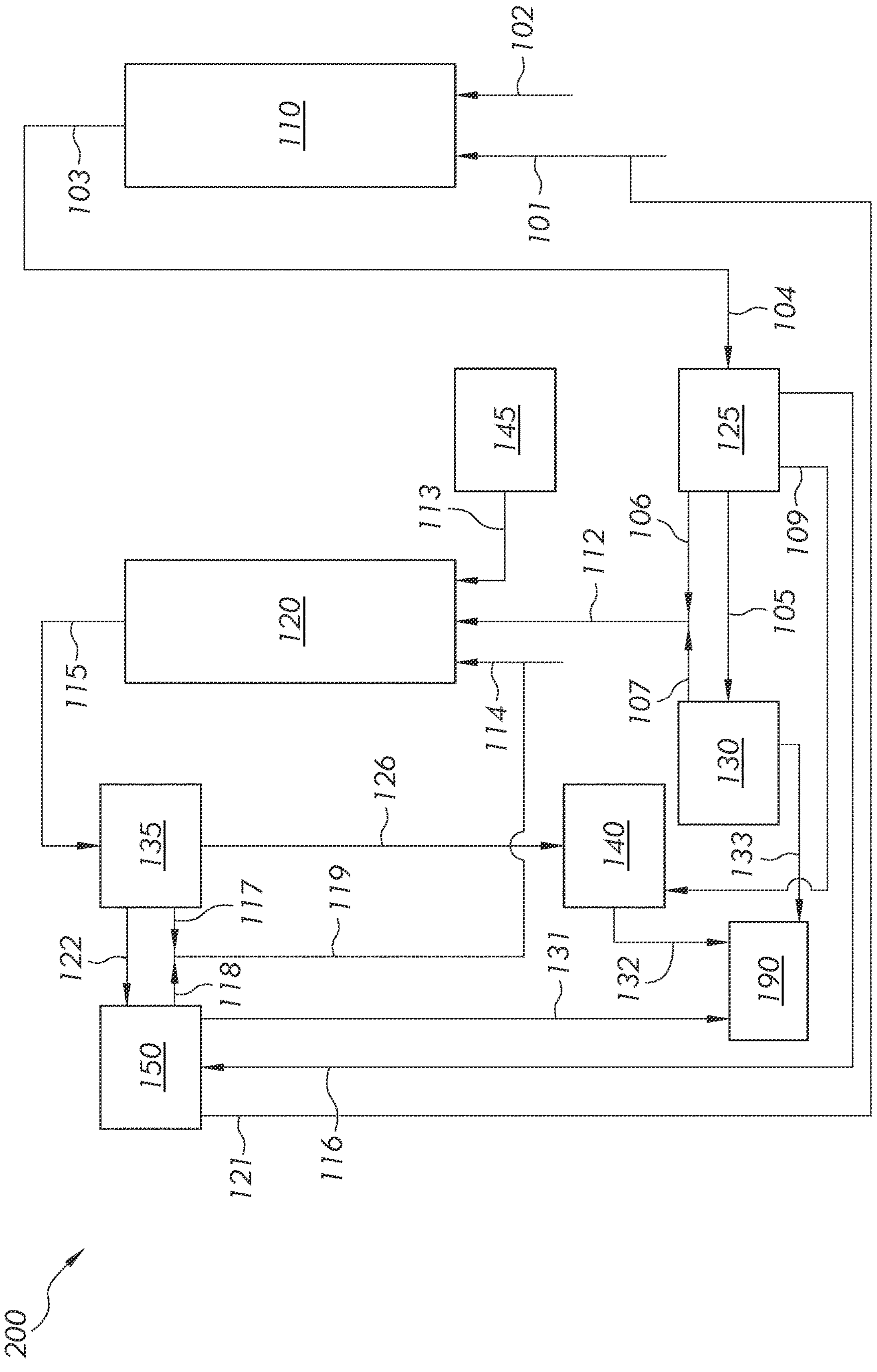
FIG. 2 schematically depicts another system for producing hydrogen gas, according to one or more embodiments disclosed herein.

Now referring to FIG. 2, in one or more embodiments, the system 200 for hydrogen production may be substantially similar to the system 100 depicted in FIG. 1 for hydrogen production. The difference between the system 200 depicted in FIG. 2 and the system 100 depicted in FIG. 1 relates to the introduction of carbon dioxide from the second separation unit 135 as an additional reactant for the oxidation of a metal in a reduced state within the second reactor 120.

In addition to passing water to the second reactor 120, the system 200 for hydrogen production may further include passing carbon dioxide (from a second carbon dioxide feed stream 114) to the second reactor 120 comprising a metal in a reduced state such that the water, carbon dioxide, and metal in a reduced state contact one another. The water, carbon dioxide, and metal in a reduced state may react to form a metal carbonate and hydrogen. One example of such a reaction is shown in Reaction IV, above.

In embodiments, carbon dioxide passed to the second reactor 120 may be the carbon dioxide separated in the first or second separation units, 125 and 135. In embodiments, carbon dioxide may enter the second reactor 120 via the second carbon dioxide feed stream 114. The second carbon dioxide feed stream 114 may comprise carbon dioxide from a carbon dioxide stream 119. The carbon dioxide stream 119 may comprise carbon dioxide from a third carbon dioxide effluent 117, a first carbon dioxide storage vessel effluent 118, or both.

Still referring to FIG. 2, the system 200 for hydrogen production may further include passing water (from a water feed stream 113) to the second reactor 120 while the metal carbonate is positioned within the second reactor 120 such that the water and the metal carbonate contact one another. The water and metal carbonate may react to form at least the metal in an oxidized state, hydrogen, and carbon dioxide One example of such a reaction is shown in Reaction V, above.

The system 200 for hydrogen production may further include passing carbon monoxide (from the carbon monoxide stream 112) to the second reactor 120 while the metal in an oxidized state is positioned within the second reactor 120 such that the carbon monoxide and the metal in an oxidized state contact one another. The carbon monoxide and metal carbonate may react to form at least the metal in a reduced state and carbon dioxide One example of such a reaction is shown in Reaction III, above.

It is contemplated that the first effluent 103 may bypass the first separation unit 125, similar to the embodiment in FIG. 4. In such embodiments, the first effluent 103 will be passed directly to the second reactor 120. The first effluent 103 may comprise a combination of carbon monoxide and hydrogen from the first effluent 103. In embodiments, the first effluent 103 may comprise carbon dioxide from the carbon dioxide feed stream 101.

Still referring to FIG. 2, in embodiments, the passing of water (via the water feed stream 113) and carbon dioxide (via the second carbon dioxide feed stream 114) to the second reactor 120, the passing of additional water (via the water feed stream 113 again) to the second reactor 120, and the passing of the carbon monoxide (via the carbon monoxide stream 112) is sequentially alternated such that the metal in a reduced state formed from the third reaction is then the metal in a reduced state reacted in the fourth reaction.

Figure 3:
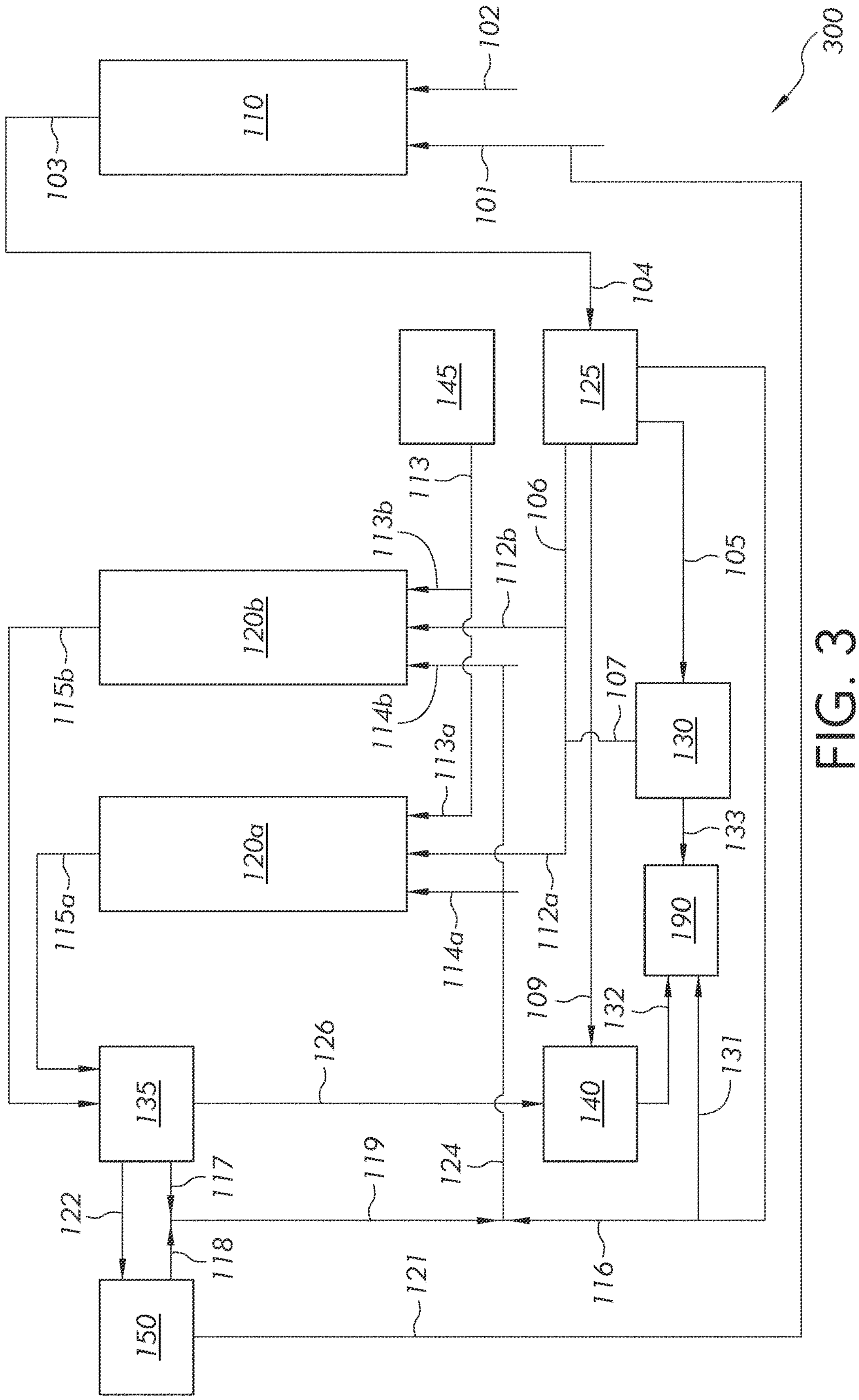
FIG. 3 schematically depicts yet another system for producing hydrogen gas, according to one or more embodiments disclosed herein.

Now referring to FIG. 3, in one or more embodiments, the system 300 for hydrogen production may be substantially similar to the system 200 depicted in FIG. 2 for hydrogen production. The difference between the system 300 depicted in FIG. 2 and the system 200 depicted in FIG. 2 relates to the inclusion of an additional reactor for water splitting resulting in a second reactor 120*a* and a third reactor 120*b*, with both operating in the same manner as in the system 200 depicted in FIG. 2, but in different phases. That is, reduction of the metal may occur in 120*a* while oxidation occurs in 120*b*. In such embodiments, a more continuous outflow of product hydrogen can be achieved as compared to distinct, whole system phases of metal oxide reduction and re-oxidation.

The system 300 for hydrogen production may further include passing water (from a first water feed stream 113*a*) to the second reactor 120*a* comprising a metal in a reduced state. In embodiments, the first water feed stream 113*a* may be split stream from the water feed stream 113. In addition to passing water to the second reactor 120*a*, the system 300 for hydrogen production may further include passing carbon dioxide (from a second carbon dioxide feed stream 124*a*) to the second reactor 120*a* comprising a metal in a reduced state such that the water, carbon dioxide, and metal in a reduced state contact one another. The water, carbon dioxide, and metal in a reduced state may react to form a metal carbonate and hydrogen.

In embodiments, carbon dioxide passed to the second reactor 120*a* may be the carbon dioxide separated in the first or second separation units, 125 and 135. In embodiments, carbon dioxide may enter the second reactor 120*a* via the second carbon dioxide feed stream 124*a*. The second carbon dioxide feed stream 124*a* may comprise carbon dioxide from a mixed carbon dioxide stream 124. The mixed carbon dioxide stream 124 may comprise carbon dioxide from the carbon dioxide stream 119 and the first carbon dioxide effluent 116.

Still referring to FIG. 3, the system 300 for hydrogen production may further include passing water (from the first water feed stream 113*a*) to second reactor 120*a* while the metal carbonate is positioned within the second reactor 120*a* such that the water and the metal carbonate contact one another. The water and metal carbonate may react to form at least the metal in an oxidized state, hydrogen, and carbon dioxide.

The system 300 for hydrogen production may further include passing carbon monoxide (from a first carbon monoxide stream 112*a*) to the second reactor 120*a* while the metal in an oxidized state is positioned within the second reactor 120*a* such that the carbon monoxide and the metal in an oxidized state contact one another. The carbon monoxide and metal in an oxidized state may react to form at least the metal in a reduced state and carbon dioxide.

In embodiments, carbon monoxide passed to the second reactor 120*a* may be the carbon monoxide produced in the first reactor 110. In embodiments, carbon monoxide may enter the second reactor 120*a* via the first carbon monoxide stream 112*a*. The carbon monoxide stream 112*a* from the second carbon monoxide effluent 106, the carbon monoxide storage vessel effluent 107, or both.

It is contemplated that the first effluent 103 may bypass the first separation unit 125, similar to the embodiment in FIG. 4. In such embodiments, the first effluent may be passed directly to the second reactor 120*a*, third reactor 120*b*, or both. The first effluent 103 may comprise a combination of carbon monoxide and hydrogen from the first effluent 103. In embodiments, the first effluent 103 may comprise carbon dioxide from the carbon dioxide feed stream 101.

Still referring to FIG. 3, the hydrogen and carbon dioxide produced in the second reactor 120*a* through the previously described serious of reactions may then exit the second reactor 120*a* via a first mixed gas effluent 115*a*. The first mixed gas effluent 115*a* may then be passed to the second separation unit 135.

The system 300 for hydrogen production may further include passing water (from a second water feed stream 113*b*) to the third reactor 120*b* comprising a metal in a reduced state. In embodiments, the second water feed stream 113*b* may be split stream from the water feed stream 113. In addition to passing water to the third reactor 120*b*, the system 300 for hydrogen production may further include passing carbon dioxide (from a third carbon dioxide feed stream 124*b*) to the third reactor 120*b* comprising a metal in a reduced state such that the water, carbon dioxide, and metal in a reduced state contact one another. The water, carbon dioxide, and metal in a reduced state may react to form a metal carbonate and hydrogen.

In embodiments, carbon dioxide passed to the third reactor 120*b* may be the carbon dioxide separated in the first or second separation units, 125 and 135. In embodiments, carbon dioxide may enter the third reactor 120*b* via the third carbon dioxide feed stream 124*b*. The third carbon dioxide feed stream 124*b* may comprise carbon dioxide from a mixed carbon dioxide stream 124. The mixed carbon dioxide stream 124 may comprise carbon dioxide from the carbon dioxide stream 119 and the first carbon dioxide effluent 116.

The system 300 for hydrogen production may further include passing water (from the second water feed stream 113*b*) to the third reactor 120*b* while the metal carbonate is positioned within the third reactor 120*b* such that the water and the metal carbonate contact one another. The water and metal carbonate may react to form at least the metal in an oxidized state, hydrogen, and carbon dioxide The system 300 for hydrogen production may further include passing carbon monoxide (from a second carbon monoxide stream 112*b*) to the third reactor 120*b* while the metal in an oxidized state is positioned within the third reactor 120*b* such that the carbon monoxide and the metal in an oxidized state contact one another. The carbon monoxide and metal in an oxidized state may react to form at least the metal in a reduced state and carbon dioxide.

In embodiments, carbon monoxide passed to the third reactor 120*b* may be the carbon monoxide produced in the first reactor 110. In embodiments, carbon monoxide may enter the third reactor 120*b* via the second carbon monoxide stream 112*b*. The second carbon monoxide stream 112*b* may comprise carbon monoxide from the second carbon monoxide effluent 106, the carbon monoxide storage vessel effluent 107, or both.

The hydrogen and carbon dioxide produced in the third reactor 120*b* through the previously described serious of reactions may then exit the third reactor 120*b* via a second mixed gas effluent 115*b*. The second mixed gas effluent 115*b* may then be passed to the second separation unit 135.

The second reactor 120*a* and the third reactor 120*b* may operate simultaneously such that the second reactor 120*a* oxidizes the metal in the reduced state while the third reactor 120*b* reduces the metal in an oxidized state, and the second reactor 120*a* reduces the metal in an oxidized state while the third reactor 120*b* oxidizes the metal in a reduced state. This embodiment allows for the production of hydrogen in one reactor while another reactor regenerates the metal in a reduced state, allowing for the possibility of production of hydrogen gas from each reactor in alternative fashion.

The present disclosure includes multiple aspects. A first aspect is a method for producing hydrogen gas, the method comprising: in a first reaction, reacting methane with carbon dioxide to form at least carbon monoxide and hydrogen; in a second reaction, reacting at least water with a metal in a reduced state to form at least hydrogen and a metal in an oxidized state; and in a third reaction, reacting the metal in an oxidized state produced in the second reaction with at least a portion of the carbon monoxide produced in the first reaction to form carbon dioxide and to reduce the metal in the oxidized state.

A second aspect of the present disclosure may include the first aspect, wherein the second and third reactions are sequentially alternated such that the reducing of the metal in the oxidized state in the third reaction forms the metal in a reduced state utilized in the second reaction.

A third aspect of the present disclosure may further comprise, in a fourth reaction, reacting carbon dioxide and water with the metal in a reduced state to form at least hydrogen and a metal carbonate; and in a fifth reaction, reacting the metal carbonate with water to from the metal in an oxidized state, carbon dioxide, and hydrogen.

A fourth aspect of the present disclosure may include any of the previous aspects, wherein the metal in an oxidized state comprises one or more of zinc oxide, iron oxide, tin oxide, cesium oxide, magnesium oxide, cobalt oxide, cadmium oxide, or germanium oxide.

A fifth aspect of the present disclosure may include any of the previous aspects, wherein the metal in an oxidized state comprises iron oxide.

A sixth aspect of the present disclosure may include any of the previous aspects, wherein the metal in an oxidized state comprises $Fe_3O_4$.

A seventh aspect of the present disclosure may include any of the previous aspects, wherein the metal in a reduced state comprises $Fe^0$.

An eighth aspect of the present disclosure may include any of the previous aspects, wherein the first reaction is in a first reactor, and the second reaction and third reaction are in a second reactor.

A ninth aspect of the present disclosure is a method for producing hydrogen that comprises passing methane and carbon dioxide to a first reactor, such that the methane and carbon dioxide react to form at least carbon monoxide and hydrogen; passing water to a second reactor comprising a metal in a reduced state, such that the water reacts with the metal in a reduced state to form at least hydrogen and a metal in an oxidized state in the second reactor; and passing at least a portion of the carbon monoxide produced in the first reactor to the second reactor while the metal in an oxidized state is positioned in the second reactor, such that the metal in an oxidized state reacts with carbon monoxide to form at least the metal in a reduced state and carbon dioxide.

A tenth aspect of the present disclosure may include the ninth aspect, wherein the passing of the water to the second reactor and the passing of at least a portion of the carbon monoxide produced in the first reactor to the second reactor are sequentially alternated, such that the metal in a reduced state formed from the reaction of the metal in an oxidized state with carbon dioxide forms the metal in a reduced state that is reacted with water.

An eleventh aspect of the present disclosure may include the ninth aspect, further comprising passing carbon dioxide to the second reactor comprising the metal in a reduced state such that the metal in a reduced state reacts with carbon dioxide and water to form at least hydrogen and a metal carbonate, and passing water to the second reactor comprising the metal carbonate and hydrogen such that the metal carbonate reacts with the water to form the metal in an oxidized state and carbon dioxide.

A twelfth aspect of the present disclosure may include the eleventh aspect, wherein passing carbon dioxide to the second reactor comprises: passing the carbon dioxide produced in the second reactor and hydrogen produced in the second reactor to a second separation unit, separating the carbon dioxide from the hydrogen in the second separation unit, passing the carbon dioxide separated in the second separation unit to a carbon dioxide storage vessel, and passing the carbon dioxide from the carbon dioxide storage vessel to the second reactor.

A thirteenth aspect of the present disclosure may include any of the previous aspects, wherein passing the carbon monoxide produced in the first reactor to the second reactor comprises: passing at least some of the carbon monoxide produced in the first reactor and the hydrogen produced in the first reactor to a first separation unit, separating the carbon monoxide from the hydrogen in the first separation unit, passing the carbon monoxide separated in the first separation unit to a carbon monoxide storage vessel, and passing the carbon monoxide from the carbon monoxide storage vessel to the second reactor.

A fourteenth aspect of the present disclosure may include any of the previous aspects, further comprising passing the carbon monoxide produced in the first reactor to the second reactor comprises directly passing at least a portion of the carbon monoxide produced in the first reactor to the second reactor.

A fifteenth aspect of the present disclosure may include any of the previous aspects, further comprising passing water to a third reactor comprising a metal in a reduced state, such that the water reacts with the metal in a reduced state to form at least hydrogen and a metal in an oxidized state in the third reactor, and passing at least a portion of the carbon monoxide produced in the first reactor to the third reactor while the metal in an oxidized state is positioned in the third reactor, such that the metal in an oxidized state reacts with carbon monoxide to form at least the metal in a reduced state and carbon dioxide A sixteenth aspect of the present disclosure may include the fifteenth aspect, wherein the second reactor is oxidizing the metal in the reduced state while the third reactor is reducing the metal in an oxidized state, the second reactor is reducing the metal in an oxidized state while the third reactor is oxidizing the metal in a reduced state.

A seventeenth aspect of the present disclosure may include any of the previous aspects, wherein the metal in an oxidized state comprises one or more of zinc oxide, iron oxide, tin oxide, cesium oxide, magnesium oxide, cobalt oxide, cadmium oxide, or germanium oxide.

An eighteenth aspect of the present disclosure may include any of the previous aspects, wherein the metal in an oxidized state comprises iron oxide.

A nineteenth aspect of the present disclosure may include any of the previous aspects, wherein the metal in an oxidized state is $Fe_3O_4$.

A twentieth aspect of the present disclosure may include any of the previous aspects, wherein the metal in a reduced state is $Fe^0$.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

It is also noted that recitations herein of "at least one" component, element, etc., should not be used to create an inference that the alternative use of the articles "a" or "an" should be limited to a single component, element, etc.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "carbon dioxide stream" passing from a first system component to a second system component should be understood to equivalently disclose "carbon dioxide" passing from a first system component to a second system component, and the like.

What is claimed is:

1. A method for producing hydrogen gas, the method comprising:
- in a first reaction, reacting methane with carbon dioxide to form at least carbon monoxide and hydrogen;
- passing the carbon monoxide produced in the first reaction and the hydrogen produced in the first reaction to a first separation unit;
- separating the carbon monoxide from the hydrogen in the first separation unit;
- in a second reaction, reacting at least water with a metal in a reduced state to form at least hydrogen and a metal in an oxidized state; and
- in a third reaction, reacting the metal in an oxidized state produced in the second reaction with at least a portion of the carbon monoxide produced in the first reaction that is separated from the hydrogen in the separation unit to form carbon dioxide and to reduce the metal in the oxidized state.

2. The method of claim 1, wherein the second and third reactions are sequentially alternated such that the reducing of the metal in the oxidized state in the third reaction forms the metal in a reduced state utilized in the second reaction.

3. The method of claim 1, further comprising:
- in a fourth reaction, reacting carbon dioxide and water with the metal in a reduced state to form at least hydrogen and a metal carbonate; and
- in a fifth reaction, reacting the metal carbonate with water to from the metal in an oxidized state, carbon dioxide, and hydrogen.

4. The method of claim 1, wherein the metal in an oxidized state comprises one or more of zinc oxide, iron oxide, tin oxide, cesium oxide, magnesium oxide, cobalt oxide, cadmium oxide, or germanium oxide.

5. The method of claim 1, wherein the metal in an oxidized state comprises iron oxide.

6. The method of claim 1, wherein the metal in an oxidized state comprises $Fe_3O_4$.

7. The method of claim 1, wherein the metal in a reduced state comprises $Fe^0$.

8. The method of claim 1, wherein the first reaction is in a first reactor, and the second reaction and third reaction are in a second reactor.

9. A method for producing hydrogen, the method comprising:
- passing methane and carbon dioxide to a first reactor, such that the methane and carbon dioxide react to form at least carbon monoxide and hydrogen;
- passing water to a second reactor comprising a metal in a reduced state, such that the water reacts with the metal in a reduced state to form at least hydrogen and a metal in an oxidized state in the second reactor;
- passing at least a portion of the carbon monoxide produced in the first reactor to the second reactor while the metal in an oxidized state is positioned in the second reactor, such that the metal in an oxidized state reacts with carbon monoxide to form at least the metal in a reduced state and carbon dioxide; and
- wherein passing the carbon monoxide produced in the first reactor to the second reactor comprises:
  - passing at least some of the carbon monoxide produced in the first reactor and the hydrogen produced in the first reactor to a first separation unit;
  - separating the carbon monoxide from the hydrogen in the first separation unit;
  - passing the carbon monoxide separated in the first separation unit to a carbon monoxide storage vessel; and
  - passing the carbon monoxide from the carbon monoxide storage vessel to the second reactor.

10. The method of claim 9, wherein the passing of the water to the second reactor and the passing of at least a portion of the carbon monoxide produced in the first reactor to the second reactor are sequentially alternated, such that the metal in a reduced state formed from the reaction of the metal in an oxidized state with carbon dioxide forms the metal in a reduced state that is reacted with water.

11. The method of claim 9, further comprising:

passing carbon dioxide to the second reactor comprising the metal in a reduced state such that the metal in a reduced state reacts with carbon dioxide and water to form at least hydrogen and a metal carbonate; and passing water to the second reactor comprising the metal carbonate and hydrogen such that the metal carbonate reacts with the water to form the metal in an oxidized state and carbon dioxide.

12. The method of claim 11, wherein passing carbon dioxide to the second reactor comprises:

passing the carbon dioxide produced in the second reactor and hydrogen produced in the second reactor to a second separation unit;

separating the carbon dioxide from the hydrogen in the second separation unit;

passing the carbon dioxide separated in the second separation unit to a carbon dioxide storage vessel; and passing the carbon dioxide from the carbon dioxide storage vessel to the second reactor.

13. The method of claim 9, wherein passing the carbon monoxide produced in the first reactor to the second reactor comprises directly passing at least a portion of the carbon monoxide produced in the first reactor to the second reactor.

14. The method of claim 9, further comprising:

passing water to a third reactor comprising a metal in a reduced state, such that the water reacts with the metal in a reduced state to form at least hydrogen and a metal in an oxidized state in the third reactor; and passing at least a portion of the carbon monoxide produced in the first reactor to the third reactor while the metal in an oxidized state is positioned in the third reactor, such that the metal in an oxidized state reacts with carbon monoxide to form at least the metal in a reduced state and carbon dioxide.

15. The method of claim 14, wherein:

the second reactor is oxidizing the metal in the reduced state while the third reactor is reducing the metal in an oxidized state; and the second reactor is reducing the metal in an oxidized state while the third reactor is oxidizing the metal in a reduced state.

16. The method of claim 9, wherein the metal in an oxidized state comprises one or more of zinc oxide, iron oxide, tin oxide, cesium oxide, magnesium oxide, cobalt oxide, cadmium oxide, or germanium oxide.

17. The method of claim 9, wherein the metal in an oxidized state comprises iron oxide.

18. The method of claim 9, wherein the metal in an oxidized state is $Fe_3O_4$.

19. The method of claim 9, wherein the metal in a reduced state is $Fe^0$.

20. A method for producing hydrogen, the method comprising:

passing methane and carbon dioxide to a first reactor, such that the methane and carbon dioxide react to form at least carbon monoxide and hydrogen;

passing water to a second reactor comprising a metal in a reduced state, such that the water reacts with the metal in a reduced state to form at least hydrogen and a metal in an oxidized state in the second reactor;

passing at least a portion of the carbon monoxide produced in the first reactor to the second reactor while the metal in an oxidized state is positioned in the second reactor, such that the metal in an oxidized state reacts with carbon monoxide to form at least the metal in a reduced state and carbon dioxide;

passing water to a third reactor comprising a metal in a reduced state, such that the water reacts with the metal in a reduced state to form at least hydrogen and a metal in an oxidized state in the third reactor;

passing at least a portion of the carbon monoxide produced in the first reactor to the third reactor while the metal in an oxidized state is positioned in the third reactor, such that the metal in an oxidized state reacts with carbon monoxide to form at least the metal in a reduced state and carbon dioxide;

wherein the second reactor is oxidizing the metal in the reduced state while the third reactor is reducing the metal in an oxidized state; and the second reactor is reducing the metal in an oxidized state while the third reactor is oxidizing the metal in a reduced state.

* * * * *